(12) United States Patent
Ritchey

(10) Patent No.: US 8,196,422 B2
(45) Date of Patent: Jun. 12, 2012

(54) ATMOSPHERIC WATER COLLECTION DEVICE

(76) Inventor: Jonathan G. Ritchey, Vernon (CA)

( * ) Notice: Subject to any disclaimer, the term of this patent is extended or adjusted under 35 U.S.C. 154(b) by 168 days.

(21) Appl. No.: 12/826,448

(22) Filed: Jun. 29, 2010

(65) Prior Publication Data

US 2010/0263396 A1 Oct. 21, 2010

Related U.S. Application Data

(63) Continuation of application No. 10/963,646, filed on Oct. 14, 2004, now abandoned.

(60) Provisional application No. 60/510,155, filed on Oct. 14, 2003.

(51) Int. Cl.
*F25B 27/00* (2006.01)
(52) U.S. Cl. ........ 62/235.1; 62/92; 62/93; 62/236; 62/419; 62/271; 62/272; 62/285; 62/476
(58) Field of Classification Search ........ 62/92, 93, 62/235.1, 236, 419, 271, 272, 285, 476
See application file for complete search history.

(56) References Cited

U.S. PATENT DOCUMENTS

| | | | | |
|---|---|---|---|---|
| 4,285,702 | A * | 8/1981 | Michel et al. | 95/124 |
| 4,351,651 | A * | 9/1982 | Courneya | 96/397 |
| 4,386,501 | A * | 6/1983 | Jaeger | 62/112 |
| 4,459,177 | A | 7/1984 | O'Hare | |
| 6,170,279 | B1 * | 1/2001 | Li | 62/238.3 |
| 6,574,979 | B2 * | 6/2003 | Faqih | 62/285 |
| 6,622,491 | B2 * | 9/2003 | Hofmann | 62/6 |
| 2003/0033829 | A1 | 2/2003 | Smith et al. | |

FOREIGN PATENT DOCUMENTS

| | | |
|---|---|---|
| CH | 608 260 A5 | 12/1978 |
| DE | 197 34 887 | 3/1999 |
| FR | 2 813 087 | 2/2002 |

* cited by examiner

*Primary Examiner* — Frantz Jules
*Assistant Examiner* — Azim Rahim
(74) *Attorney, Agent, or Firm* — Fasken Martineau Dumoulin LLP; Susan M. Ben-Oliel

(57) ABSTRACT

The present invention is directed at a solar powered heat exchange system preferably used to drive a water collection device, which condenses water vapor in atmospheric air to water. The device comprises means for drawing the atmospheric air into the device; means for condensing the moisture vapor in the atmospheric air into water; and means for collecting the water.

18 Claims, 8 Drawing Sheets

Figure 10

DEW POINT CALCULATION CHART
Ambient Air Temperature - Fahrenheit

| Relative Humidity | 20 | 30 | 40 | 50 | 60 | 70 | 80 | 90 | 100 | 110 | 120 |
|---|---|---|---|---|---|---|---|---|---|---|---|
| 90% | 18 | 28 | 37 | 47 | 57 | 67 | 77 | 87 | 97 | 107 | 117 |
| 85% | 17 | 26 | 36 | 45 | 55 | 65 | 75 | 84 | 95 | 104 | 113 |
| 80% | 16 | 25 | 34 | 44 | 54 | 63 | 73 | 82 | 93 | 102 | 110 |
| 75% | 15 | 24 | 33 | 42 | 52 | 62 | 71 | 80 | 91 | 100 | 108 |
| 70% | 13 | 22 | 31 | 40 | 50 | 60 | 68 | 78 | 88 | 96 | 105 |
| 65% | 12 | 20 | 29 | 38 | 47 | 57 | 66 | 76 | 85 | 93 | 103 |
| 60% | 11 | 19 | 27 | 36 | 45 | 55 | 64 | 73 | 83 | 92 | 101 |
| 55% | 9 | 17 | 25 | 34 | 43 | 53 | 61 | 70 | 80 | 89 | 98 |
| 50% | 6 | 15 | 23 | 31 | 40 | 50 | 59 | 67 | 77 | 86 | 94 |
| 45% | 4 | 13 | 21 | 29 | 37 | 47 | 56 | 64 | 73 | 82 | 91 |
| 40% | 1 | 11 | 18 | 26 | 35 | 43 | 52 | 61 | 69 | 78 | 87 |
| 35% | -2 | 8 | 16 | 23 | 31 | 40 | 48 | 57 | 65 | 74 | 83 |
| 30% | -6 | 4 | 13 | 20 | 28 | 36 | 44 | 52 | 61 | 69 | 77 |

ATMOSPHERIC WATER COLLECTION DEVICE

CROSS REFERENCE TO RELATED APPLICATIONS

This application is a continuation of application Ser. No. 10/963,646 filed Oct. 14, 2004 and which claims the benefit of U.S. Provisional Application No. 60/510,155, filed Oct. 14, 2003, which is incorporated herein by reference.

FIELD OF THE INVENTION

The present invention relates in general with water collection and more specifically to an atmospheric water collection device.

BACKGROUND OF THE INVENTION

In recent years, global concerns regarding insufficient potable water sources have grown to epidemic proportions. The most viable sources of fresh water include water provided by lakes, rivers, and artesian wells. Unfortunately, these water sources are not sustainable and continue to decline both in capacity and purity at alarming rates. As each year passes, the problem worsens due to factors such as climate changes, environmental pollution, and population growth. In a growing number of regions in the world there is inadequate water for industry, agriculture and/or drinking.

Some methods for the production of fresh water include the extraction of fresh water from salt water through desalinization processes such as electro dialysis, or reverse osmosis. Unfortunately, many of these processes produce considerable pollutants and are costly and impractical for application where power is not readily available. In addition, there is the need for water transport systems to transport the water to inland locations, which poses a lack of economic feasibility.

Overall, approximately five hundred and seventy-seven thousand km.sup.3 of water evaporates into the atmosphere from water bodies and the Earth's surface each year with the greatest percentage of water in atmospheric air remaining close to the Earth's surface. Unfortunately, this major renewable source of water is hardly being utilized.

Current technology is highly dependant on electricity or fossil fuels to power devices that attempt to create water from condensing atmospheric air through means that utilize fans, pumps, and refrigeration units. These technologies are not suitable for much of the world's population where artificial power sources are not readily available.

One prior art attempt at a means to draw water from air without the need for an applied power source is a project in Chile that uses large nets to capture water from fog. Unfortunately, this process can only be used in select areas where the presence of fog is frequent and predictable.

It is, therefore, desirable to provide an improved atmospheric water collection device, which overcomes disadvantages of the prior art.

SUMMARY OF THE INVENTION

It is an object of the present invention to obviate or mitigate at least one disadvantage of previous atmospheric water collection devices.

The present invention is directed to a device that extracts moisture vapour from atmospheric air for use as a fresh water source. This device is simple, practical, and economical while offering an advantage over conventional technology. In one embodiment natural resources such as the sun, and wind (to assist airflow or as a power source) are utilized to enable its function.

The water collection device of the present invention provides flexibility allowing for productive application in most regions of the world. As the water collection device's preferred power source is passive solar energy, the amount of water produced increases with installations of the device closer to the equator where it is hotter year round or in areas with high relative humidity.

The device's function may also be enhanced through the use of materials designed to fit within the device that allow for an increase in the surface area upon which condensation occurs. For example, the device could use metal intercoolers such as those used in radiators and air conditioners. Alternatively, more easily attainable materials such as rocks or pebbles could be used, providing passage for air while increasing the surface area upon which condensation may occur.

Although the invention does not depend on an artificial power source of any kind, supplemental applied power may be utilized to power fans to assist airflow and to power a cooling process within the device. This may be achieved through the use of a solar panel and battery situated beside the water collection device. Other more conventional applied power sources may also be utilized to improve the device's capability to condense water vapour to collect water. A wide variety of alternative sources of heat may be applied to the device such as heat generated from artificial electrical sources or a wide variety of gases.

The device preferably comprises a parabolic-shaped backdrop reflector that focuses solar energy on a generator pipe and a convection tube. This heats the generator pipe and/or the convection tube either directly, through the use of a solar reflector, or indirectly through the use of a reflector and a solar oven containing one side of a heat exchanger mechanism utilizing a solution of aqueous polyglycoether or a heat transfer medium. The other side of the heat exchange mechanism provides energy for the cooling device to function while at the same time creating airflow through the system as a result of the convection process.

Conventional refrigeration technology requires a constant source of heat as well as continuously cycling ammonia with water as an absorbent in order to provide continuous cooling action as well as needing a supply of fuel or electricity in order to function. We have applied simpler, less expensive technology that does not require typical costly energy sources in order to function.

In the different embodiments of the present invention, the device may be easily modified to become simply a cooling device for refrigeration. This is accomplished simply through removal of the airflow system and placing the evaporator in close proximity to a container to be used for cold storage. As well, our modular solar heat exchange design may be used as an energy source for alternative uses such as cooking, hot water heating, drying cloths, etc.

In a first aspect, the present invention provides a water collection device for condensing moisture vapor in atmospheric air into water, comprising means for drawing said atmospheric air into said device; means for condensing said moisture vapour in said atmospheric air into water; and means for collecting said water.

In a further embodiment, there is provided a water collection device for collecting water from moisture vapour in atmospheric air comprising a solar heating device; a storage tank for collecting said water; a generator—for heating the salt-ammonia mixture (or other appropriate mixture); a condenser coil—for cooling in the condenser tank; an evaporator—to collect distilled ammonia during generation; a means to draw air through the system; at least one air intake for taking in said atmospheric air into said device at one end and open to said storage tank and; wherein when said solar heating device and said at least one convection tube are heated up, a vacuum is created within said device which assists in drawing said atmospheric air into said device via said at least one condensation (intake) tube; wherein after said atmospheric air is drawn in, said air is cooled such that said water vapour within said air is condensed to water and collected in said storage tank; and wherein uncondensed air is then drawn through the systems by fans and returned to said atmospheric air.

In further aspect, the present invention provides a device powered by the sun that utilizes a cooling system to assist a water creation process that may as well be installed in the ground that may as well use, a counter-flow heat exchanger(s) and the earth's variant temperatures to assist in the cooling process.

In yet another aspect, there is provided an atmospheric water collection device for condensing moisture vapour in atmospheric air into water comprising at least one intake valve for receiving said atmospheric air; means for drawing said atmospheric air through said at least one intake valve; means for cooling and condensing said atmospheric air in said intake valves to water; an area for condensing said atmospheric air into water; and means for collecting said water.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 10 is a dew point chart.

DETAILED DESCRIPTION

Generally, the present invention provides a method and system for collecting water from atmospheric air.

Figure 1:
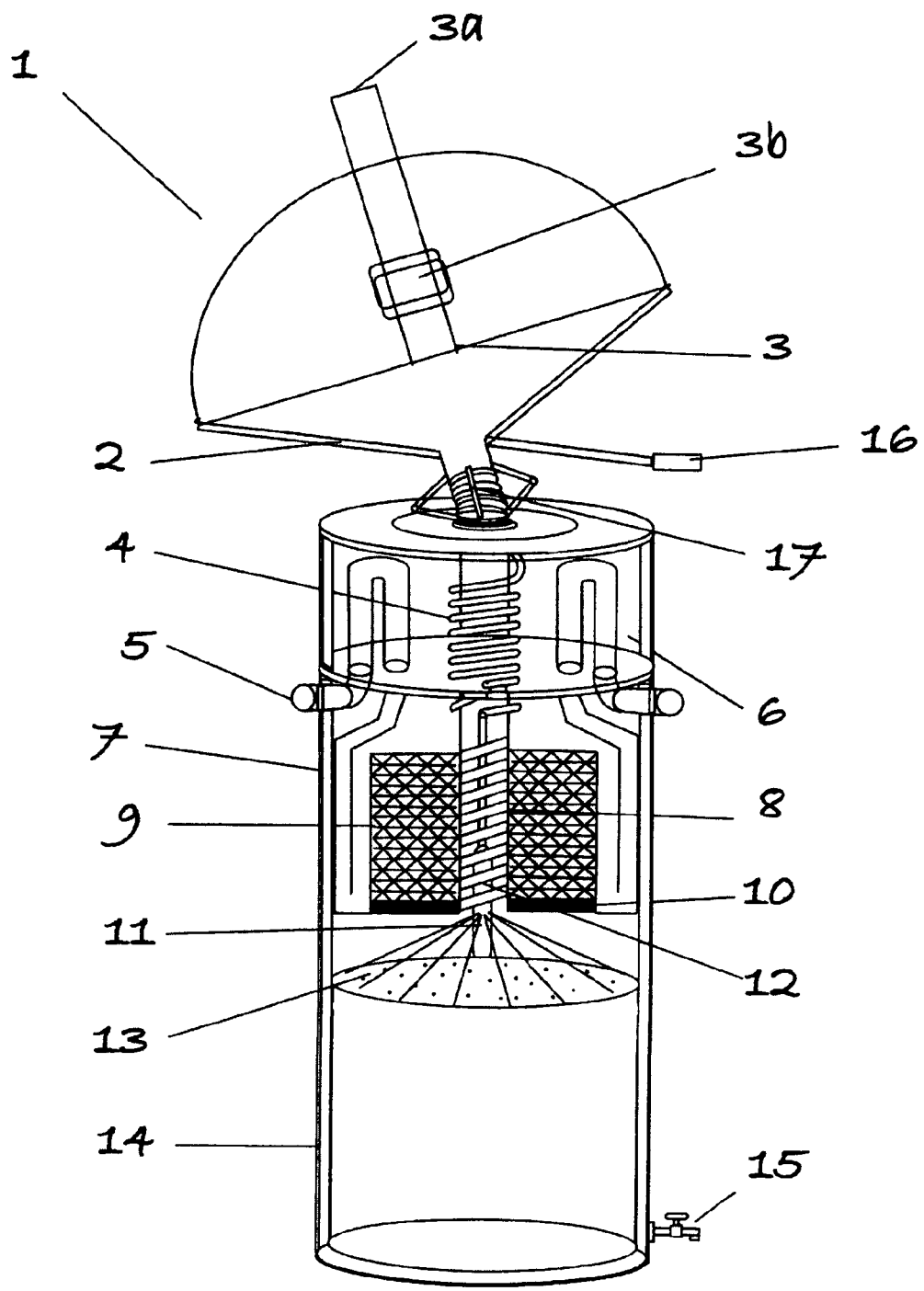
FIG. 1 is a side view of a water collection device in accordance with the present invention.

Turning to FIG. 1, a side view of a first embodiment of a water collection device is shown and indicated as 1.

This embodiment is a solar powered heat exchange system that supplies a controlled temperature to allow efficient function of the cooling system. This embodiment has many potential modifications and the required heat source may be generated by a wide variety of gases or electrically such as with 120 VAC or 12 VDC voltage.

Figure 3:
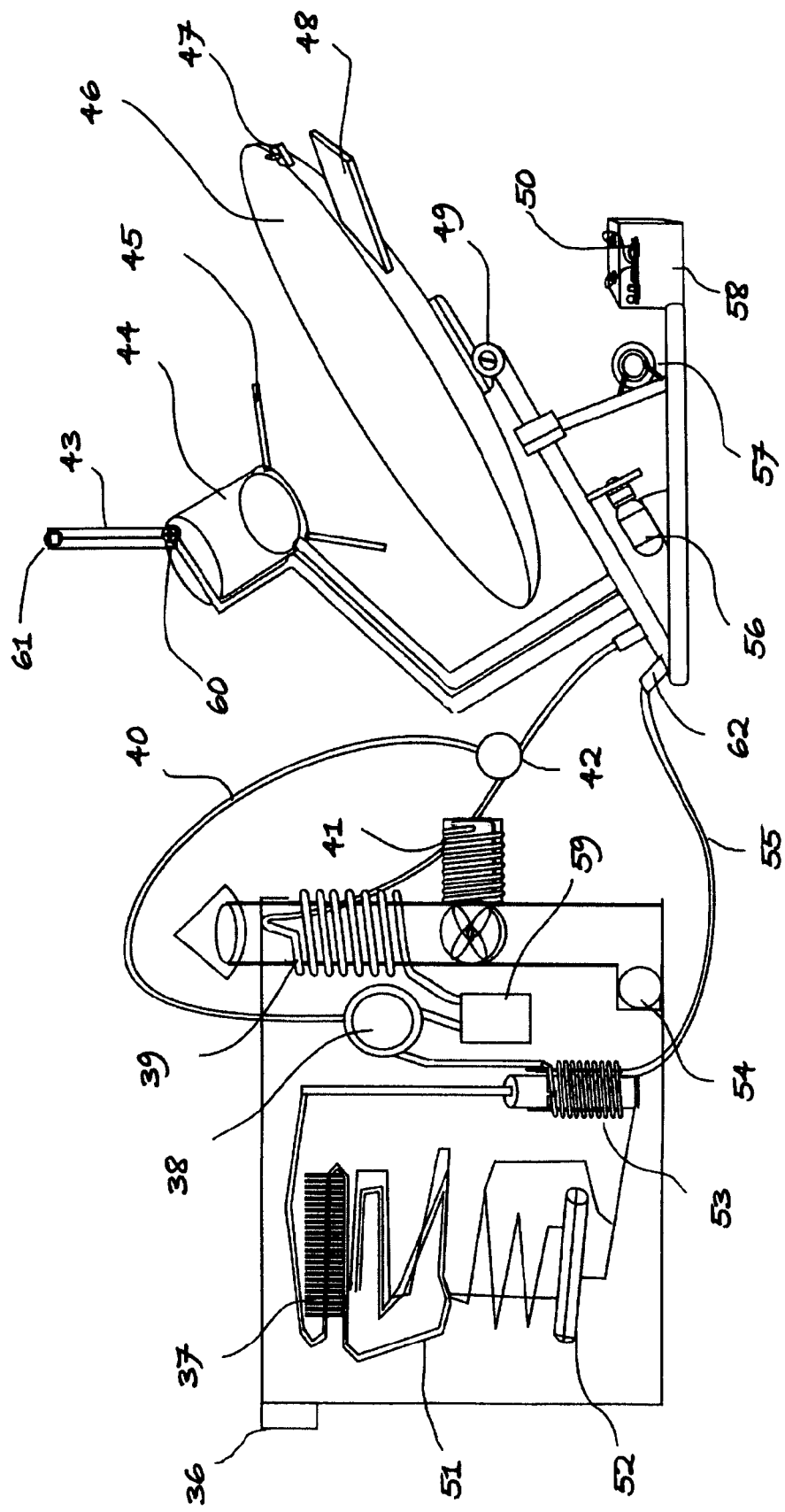
FIG. 3 is a side view of a third embodiment of a water collection device that utilizes an independent heat exchange unit.

With the preferred condenser design, refrigeration happens in intermittent cycles to coincide with available solar energy using calcium chloride as the absorber and pure ammonia as the refrigerant with the distinct advantage that salt does not evaporate during the heating process. Plumbing of the device may be divided into six parts: a generator 3 for heating the salt-ammonia mixture; a condenser coil 4 for cooling in the condenser tank; an evaporator 11—to collect distilled ammonia during generation; an integrated solar-powered air pump 3a to draw air through the system; solar powered fans 3b to move air through the system and a heat transfer/exchange device to control temperatures as shown in FIG. 3.

The generator pipe 3 or the heat exchanger is positioned at the focal point of the parabolic solar collector 2 or where the solar energy is focused and converted to heat energy to operate the device while also producing the necessary heat to pump air through the system.

The collector may be a stationary parabolic trough collector or it may move to track the sun via a movable adjustment mechanism 17 that allows movement of the reflector while not obstructing the airflow or the plumbing system to the generator pipe. The tracking arm 16 is preferably controlled by a sensor that moves the arm to track the sun via an actuator powered by the sun or other means. The preferred embodiment for solar tracking is a single drive system such as an equatorial mount as is used with modern telescopes.

Figure 4:
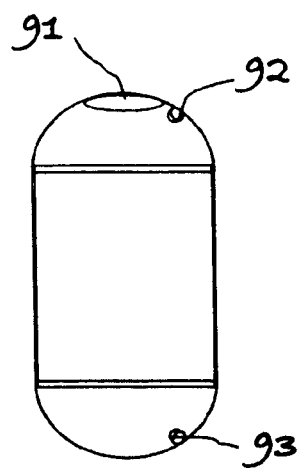
FIG. 4 is a side view of a thermal retention unit to surround the heated portion of the convection column.
Figure 5:
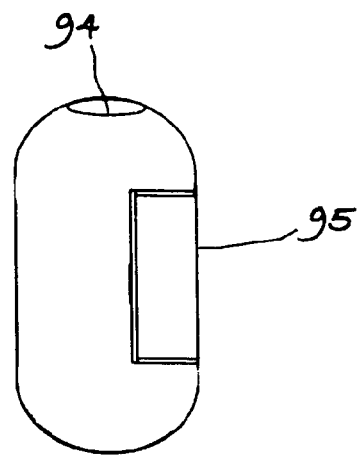
FIG. 5 is a side view of a thermal retention unit with a glass face allowing solar energy to pass through to directly heat the convection column.

The generator 3 or heat exchanger can be placed in the focus of a solar reflector 2 (parabolic dish) that tracks the sun daily or it may use a trough collector that requires only seasonal rather than daily movement of the reflector. As a means to reduce heat transfer (loss) from the generator/convection tube, the pipe may be wrapped with an insulation barrier that will assist in retaining heat. An opening in the insulation would allow the focused solar energy to heat the pipe. Alternatively, the generator pipe may be encased with in a larger pipe or cylinder so as to better retain the heat and could be filled with oil or another material so as to retain heat in this area (as shown in FIG. 4). This larger pipe may have glass allowing the focused solar energy to focus directly on the convection pipe (as shown in FIG. 5). This larger surrounding pipe may be insulated and may be lined with reflective or back materials in order to increase the device efficiencies. In addition, this larger cylinder may be fitted with fins to better capture heat energy and the inside pipe may have glass in it so as to let the solar energy directly heat the inside of the convection pipe.

A working chemical compound such as calcium chloride is placed in the generator 3 during construction and then capped. Pure (anhydrous) ammonia held in a pressurized tank is allowed to evaporate through a valve into the generator where it is absorbed by salt molecules to form a calcium chloride-ammonia solution (CaCl2-8NH3). The generator is connected to a condenser 4 preferably made from a coiled length of non-galvanized, quarter-inch pipe (rated at 2000 psi) that may be immersed in a cooling bath 6 of water or other appropriate solution. The condenser pipe descends to the evaporator 11, which cools the system in preparation for the condensation cycle during daytime operation.

The generator pipe is preferably in close proximity to the convection column 3a. They may be side by side or one may encase the other as is shown in FIG. 1.

In order to increase airflow of the device the convection column may be fitted with a fan 3b. This fan 3b may be powered by any number of means including utilization of a Sterling motor that requires only heat, a motor powered by the Seebeck effect utilizing the heat differentials within the device to create electricity, or a more typical source of power such as is generated by a photovoltaic panel.

The device draws air into the system through air intake filters 5 that cleans the air as it enters the system. The filters may be activated charcoal filters, hepa filters, semi permeable membrane or other known filters. The air may then pass through the condenser tank 6 or another part of the system such as the water storage tank 14 so as to pre-cool the air prior to the air passing through the air-cooling fins 9 attached to the evaporator 11.

As air passes through this area of the device, it decreases in temperature until it reaches its dew point thus causing water to condense. As the water collects within the device, it will fall, due to gravity, through the drip plate 13 (which also may be fitted with filters) and stored in the storage tank 14. After the air passes through the cooling fins 9 it will be drawn up the convection column and may pass through an air channel between twisted layers 12 of cooling material 8 that has suitable thermodynamic properties to allow it to hold cold temperatures and to force the air to travel an increased distance through the system. This will allow for a greater percentage of moisture to be drawn from the air. Stored water may be accessed from a release valve 15 near the bottom of the storage tank.

The interior of the device is preferably insulated with a lining 7 that will assist in reducing unwanted transfer of energy. This lining may encase only the parts of the device that are required to maintain similar cold temperatures.

Although the preferred working fluid (refrigerant) solution uses ammonia, any number of chemical combinations may be used such as, anhydrous NH3, MMA, halogenated hydrocarbons, methanol, sulfur dioxide, water, or even other such means as zeolite based refrigeration systems.

For those working fluids that require more constant temperatures to function, a sensor can be used to indicate when the generator is too hot and remedy the situation through any number of means such as adjusting the reflector off its ideal focus or an aperture mechanism could be used that would obstruct some of the solar energy so as to control the heat being applied to the generator pipe.

There are many alternative-cooling systems that may lend themselves well to this design. The design could utilize Zeolite materials and use solar energy to power pumps to create a vacuum allowing the Zeolite to offer the desired cooling needed for proper function. A propane style cooling system may be utilized as well with this system however some reconfiguration of the system may be required. In order to use propane systems, the generator pipe typically must be situated beneath the evaporator. With this design the solar reflector may be situated near the bottom of the device, focusing up so as to direct the solar focus onto that area or preferably a heat exchanger could be used to bring the heat where it is required.

In operation, the water condenser may preferably operate in a day/night cycle generating distilled ammonia during the day and reabsorbing it at night. Ammonia boils out of the generator as a hot gas at about 200-psi pressure. The gas condenses in the condenser coil then drips down into the evaporator where, ideally, ¾ of the absorbed ammonia is collected by the end of the day (at 250 degrees Fahrenheit, six of the eight ammonia molecules bound to each salt molecule are available). During the night cycle the liquefied ammonia evaporates from the tank removing large quantities of heat from the evaporator and the surrounding coolant. The calcium chloride reabsorbs the ammonia gas generating cold temperatures that freeze the water, or other prescribed material, for extended periods of time.

Figure 8:
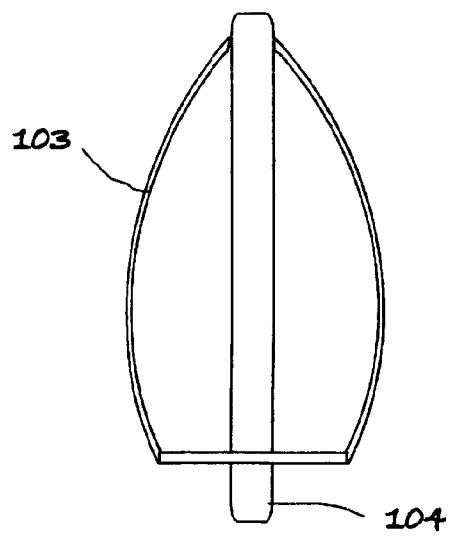
FIG. 8 is a side view of a collapsible reflector in the closed position around the convection column.

During the day, warm moist air is drawn through the system causing condensation. In this closed design, the heat that is applied to the generator pipe from the reflective dish may also create a vacuum. Air is sucked into the air intake filters by fans and/or convection from heat from the generator pipe. Air is then drawn through the system where it is cooled through a cooling fin device (increased surface area) to further cool the air. In a preferred embodiment the air will then pass through adsorbent material that draws out even more water before being drawn up through the evaporator system which houses the material that has been frozen from the nighttime operations. The concentric configuration of the column maximizes exposure to the cold temperatures in this part of the device. As the air reaches the condenser tank it is heated by the condenser coil wrapped around the air channel tube and finally expelled from the system. Under favorable sun conditions, the condenser generates sufficient energy to complete a cycle in approximately three hours. Once a generating cycle has completed, the collector may be covered or defocused to induce the cooling process or the reflector may be collapsible as seen in FIG. 8. The device may work effectively even on hazy or partly cloudy days however, electrical power may be needed to drive air through the system on these days. Preferably this power source will come from electricity that has been stored in a battery from solar panels attached to the device.

Another means to power the system is to use a parabolic reflector situated behind the convection column. This reflector would focus either directly on the convection column that is as well a generator pipe for the cooling system or directly on a heat exchange mechanism as mentioned above. The convection column and generator pipe may be integrated or kept separate in close proximity. In the convection column there is a DC fan operated by one or more thermoelectric modules that operate based on the Seebek effect and drives air through the system. At this location within the system there may be a heat-powered motor (sterling motor) that drives air through the system as indicated above.

Figure 2:
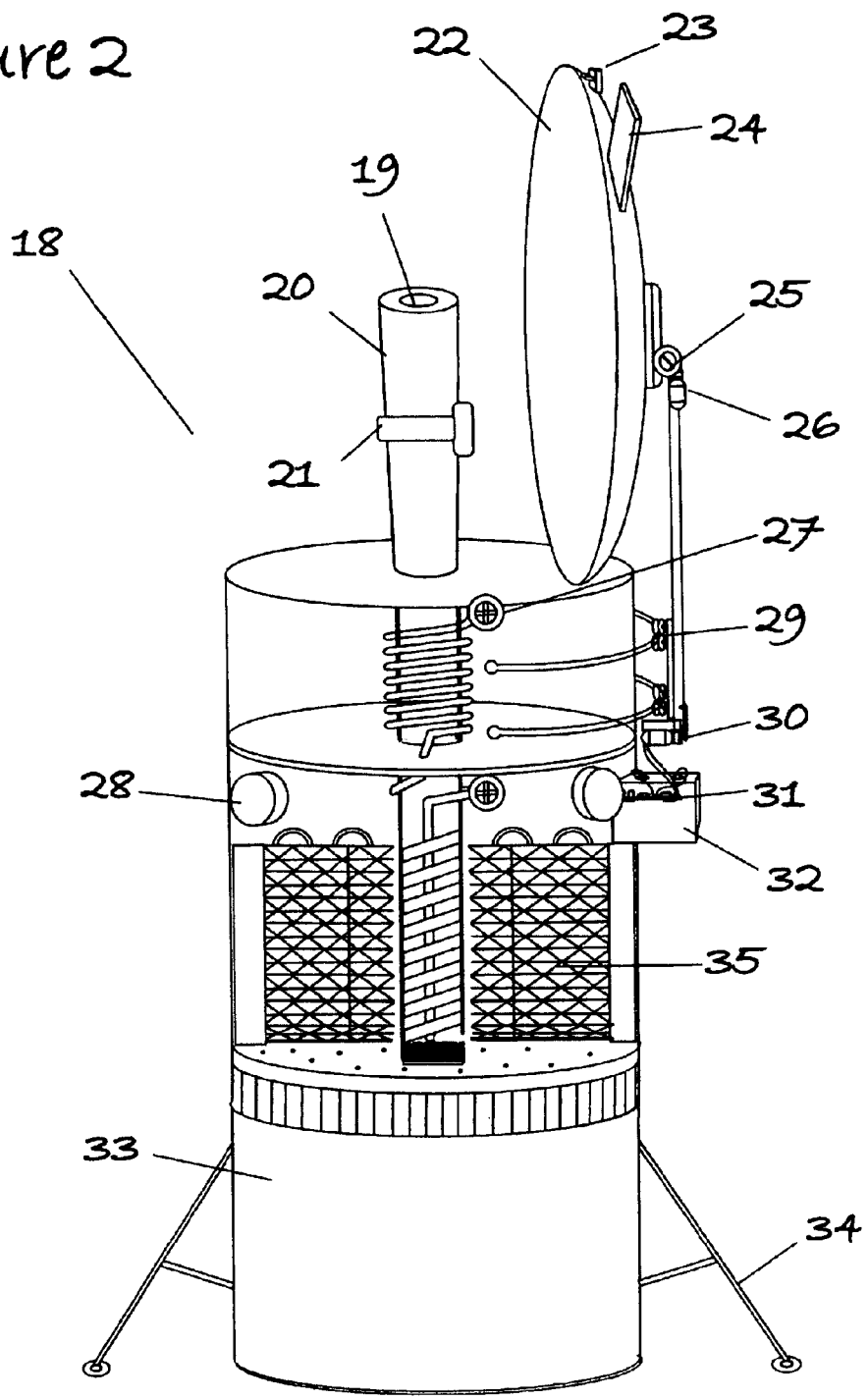
FIG. 2 is a side view of a second embodiment of a water collection device.

Turning to FIG. 2, a side view of another embodiment of the solar water collection device indicated as 18.

This embodiment may lend itself to multiple design modifications allowing for the incorporation of a wide variety of working fluids. With this embodiment, very high temperatures can be attained and focused on a smaller area lending itself well to the design modifications outlined below. The general function of the device is based on the same concept as was indicated in the description for FIG. 1 and therefore only additional features will be described herein.

The generator pipe 20 or heat exchanger is positioned at the focal point of the parabolic light collector 22 or where the light energy will be focused and converted to heat energy to operate the device while also producing the necessary heat to pump air through the device by focusing the heat energy directly on the region of the device that requires to be heated. The heat pump may be supplemented in this design through the use of a Sterling motor 21 attached to a fan that is placed inside the convection column 19 or by use of a conventional electric fan.

The reflector may move to track the sun via a movable adjustment mechanism 25 that allows movement of the reflector while not obstructing the airflow or the plumbing system to the generator pipe. The reflector may utilize a sensor mechanism 23 and circuit board 31 that controls movement of the reflector horizontally using a motor 30 and roller mechanism 29. In addition, the system will allow for the reflector to tilt up and down with another motor 26. The electrical system will not require much electricity to make these adjustments to the reflector and may be powered by a photovoltaic panel 24 that charges a small battery 32. The system will have one or more valves 27 to control the flow of working fluid through the system. The device will draw air in through the filters 28 and then through the system of cooled fins 35 that make up the required surface area to draw the water from the air. Water is then drawn into the storage tank 33 by gravity. A pair of support legs 34 are also present to support the device.

Turning to FIG. 3, another heat exchange system is shown that may function to power a wide variety of devices such as hot water systems, refrigeration or freezer devices or it may drive a water collection device.

In this design air is drawn through an air filter 36 prior to entering the system. Air would then travel though a cooling system such as described in FIG. 2 as a means to draw moisture from air. This illustration assists in illustrating the cooling system required to drive the device. This solar powered heat transfer and exchange system may be as simple as a means to heat only the generator pipe of the cooling system or for many purposes and may have a fitting 62 that allows for this portion of the device to be removed and re-attached with little effort from a variety of different devices that use heat as a source of energy. The reflector 46 will track the sun's movement through the use of a power source such as would be created from any number of sources such as the Seebeck (heat one of two dissimilar metals configured to create electricity) effect or a photovoltaic panel 48 to charge a battery 58 and drive a simple circuit 50 to power a simple tracking mechanism 47 that will drive one or more motors 56 and 57 that will allow for the reflector to move accurately tracking the sun all day. In addition, the distance and angle of the solar focal point may be manually adjusted and set where the reflector is attached to the rest of the device by an adjustment mechanism 49. The embodiment preferably includes a tracking mechanism (not shown) such as a standard equatorial mount as is used in telescopes.

The solar energy is focused on a solar heater 44 that is filled with the working fluid required to drive the system. Ideally the fluid travels through the system using only convection; however, heat pumps could be used throughout the system to facilitate flow. This heater element may be fitted with its own reflectors 45 to draw even more solar energy to the heater. Bubble pumps 60 and 61 may be used to ensure efficient operation of the system and the configuration of the heater can to be engineered with a vertical extension 43 in order to ensure convection will be adequate to drive the working fluid.

This device may be as simple as a heat exchanger as seen in FIG. 3 directly heating the generator pipe of a cooling system. In order to control the temperature applied to the cooling system some form of flow value and sensor mechanism could be employed. The illustration of FIG. 3 shows a more complicated system with greater utilization of the heat source.

As the hot fluid moves though the system, it passes through a flow valve or solenoid 42 controlled by a temperature sensor that first directs the fluid through a bypass line 40 directly to the generator 53 of the cooling system, or to a valve 38 that feeds the fluid to the generator 53. Once temperatures reach high enough levels, the valve 42 directs the fluid through another system potentially containing a coil 39 wrapped around a convection pipe that will assist to drive air through the system and any number of different means to drive a fan that will draw air through the system. The fan illustrated in FIG. 3 is a Sterling motor fan 41, that will require a starting mechanism of some kind (i.e. solenoid) as these motors will not start on there own. This fan may be driven by a DC motor powered through use of the temperature differences within the system and provide the conditions for the operation of a thermoelectric module, thus creating an electrical charge. Of course, the motor may be run from electricity from a conventional battery or other sources. Opening 54 indicates that point where the air that has passed through the condensing system enters into the convection tube that will expel this air from the system.

When the hot working fluid makes its way to the temperature sensor 59 the sensors output will control a solenoid (or any number of) flow valves 38 so that the temperature applied to the generator pipe is accurately controlled and ideal for whatever cooling system is being utilized. This cooling system resembles a typical propane powered refrigeration system that uses a generator 53, absorber 52, gas temperature exchanger 51, and evaporator 37 as well as other required means to facilitate the function of this known technology. The cooling system may be driven by the solar heat exchange unit or by propane or electricity. Once the fluid has passed through the cooling/condensing part of the device it will be directed back to the heating element 44 via a return line 55. Fittings 62 will allow the heat exchange portion of the device to be removed from the cooling apparatus allowing it to be used for other applications as well such as hot water heating or refrigeration applications.

Although construction of the device will be focussed on simplicity, the design may require multiple thermocouples with control chips, as well as meter valves and flow valves such as at the entry point of fluid into the lower fitting into the heater element. A manual control valve inserted into the flow line will allow the system to be better controlled as may be required due to the environmental conditions under which the device will operate.

FIG. 4 is a side view of a thermal retention unit to surround the heated portion of the convection column. This device would preferable be made of a metal that can sustain high temperatures without melting. This design allows for a plug for access at the top 92 and bottom 93 of the unit so it can be filled with a medium such as oil to assist in retaining the heat energy created by the system. The opening through the middle of the unit 91 will allow for the convection column to pass through the thermal retention unit.

FIG. 5 is a side view of a thermal retention unit with a glass face 95 allowing solar energy to pass through to directly heat the convection column. This design allows for the directed solar focus to pass through a preferably air tight glass insert that will allow solar rays to pass while assisting in keeping the heat energy inside the device and will act in much the same way as the glass door on a wood stove. The convection column will pass though the access hole 94 middle of this device.

Figure 6:
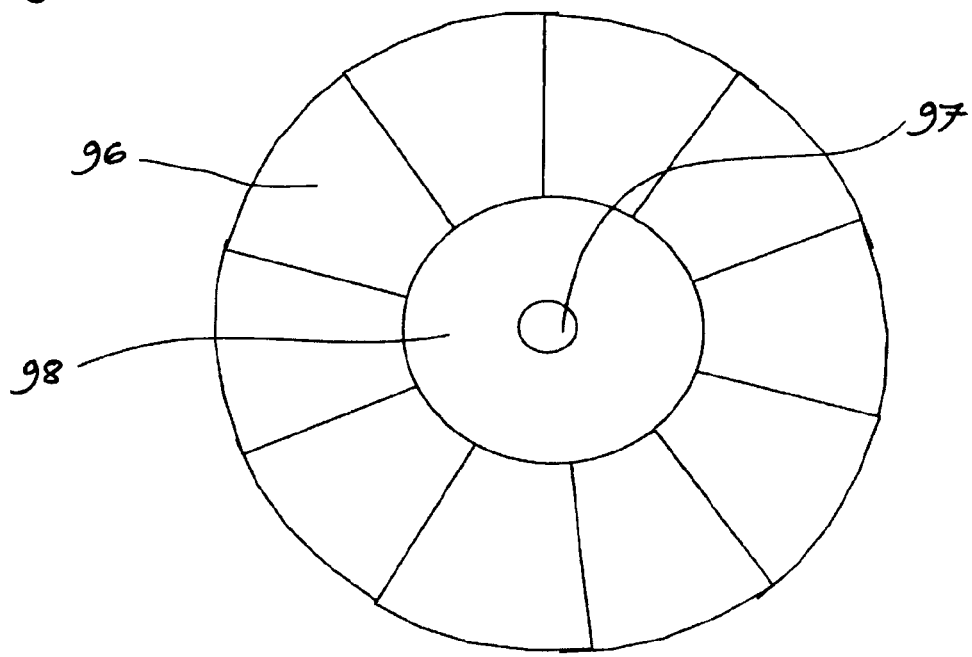
FIG. 6 is a top view of a collapsible reflector designed to encase the thermal retention unit as a means to hold in heat energy.

FIG. 6 is a top view of a collapsible reflector designed to encase the thermal retention unit as a means to hold in heat energy. This unit will be made much in the same way as a large sized conventional broccoli strainer in that if one of the panels 96 is moved all panels will be moved along with it. In this way if an actuator arm is attached to any of the panels it will allow for the movement of all the panels and thus could open and closed the reflector. The outside of this reflector will preferably be insulated to assist in holding the heat inside the device against the convection column allowing longer operations after the sun has gone down. There is a hole 97 in the center of the support base 98 that allows for the convection column to pass through.

Figure 7:
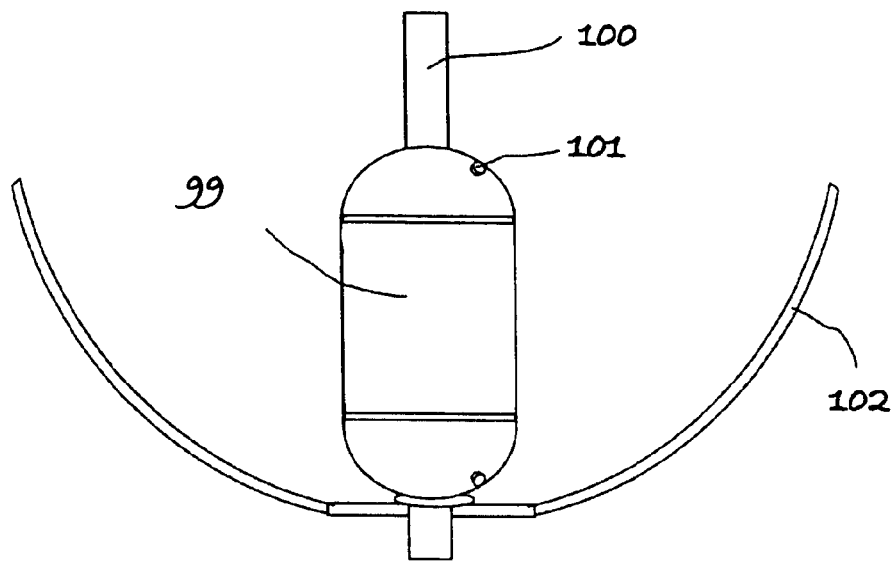
FIG. 7 is a side view of a heat retention unit surrounded by a collapsible reflector in the open position.

FIG. 7 is a side view of a heat retention unit 99 surrounded by a collapsible reflector 102 in the open position. This illustration shows an open solar reflector surrounding a solid heat retention unit placed around a convection column 100. This heat retention unit may be filled will a medium to assist in heat retention via the access plug at the top 101. Once the sun goes down the device would preferably close the reflector as a means to retain heat within the device.

FIG. 8 is a side view of a collapsible reflector 103 in the closed position around the convection column 104. This design shows that the reflector may be used without a heat retention unit and may simply be used around a convection column pipe.

Figure 9:
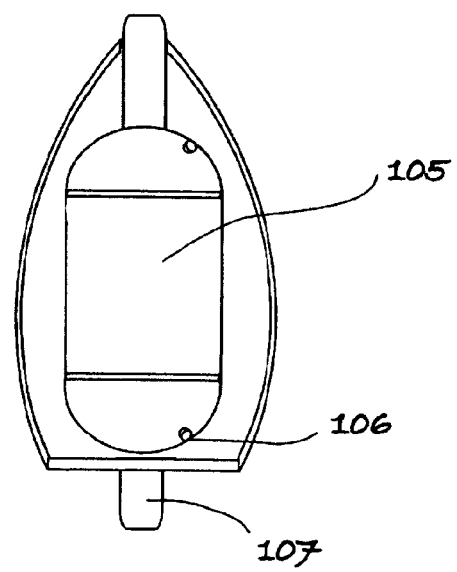
FIG. 9 is a heat retention unit surrounded by a collapsible reflector in the closed position.

FIG. 9 is a heat retention unit 105 surrounded by a collapsible reflector in the closed position. This illustration shows the configuration of collapsible reflector surrounding a heat retention unit and convection column 107 as would be seen in FIG. 7, however, in this illustration, the reflector is closed. As with the previous designs, the heat retention unit will be fitted with an access plug to fill and perhaps another to empty 106 a medium such as oil from the device.

FIG. 10 is a dew point chart. This chart illustrates a cross-section graph of temperature and Relative Humidity that will allow for the determination of dew point. Dew point is that temperature at which atmospheric air can no longer effectively hold moisture given a specific Relative Humidity.

Figure 11:
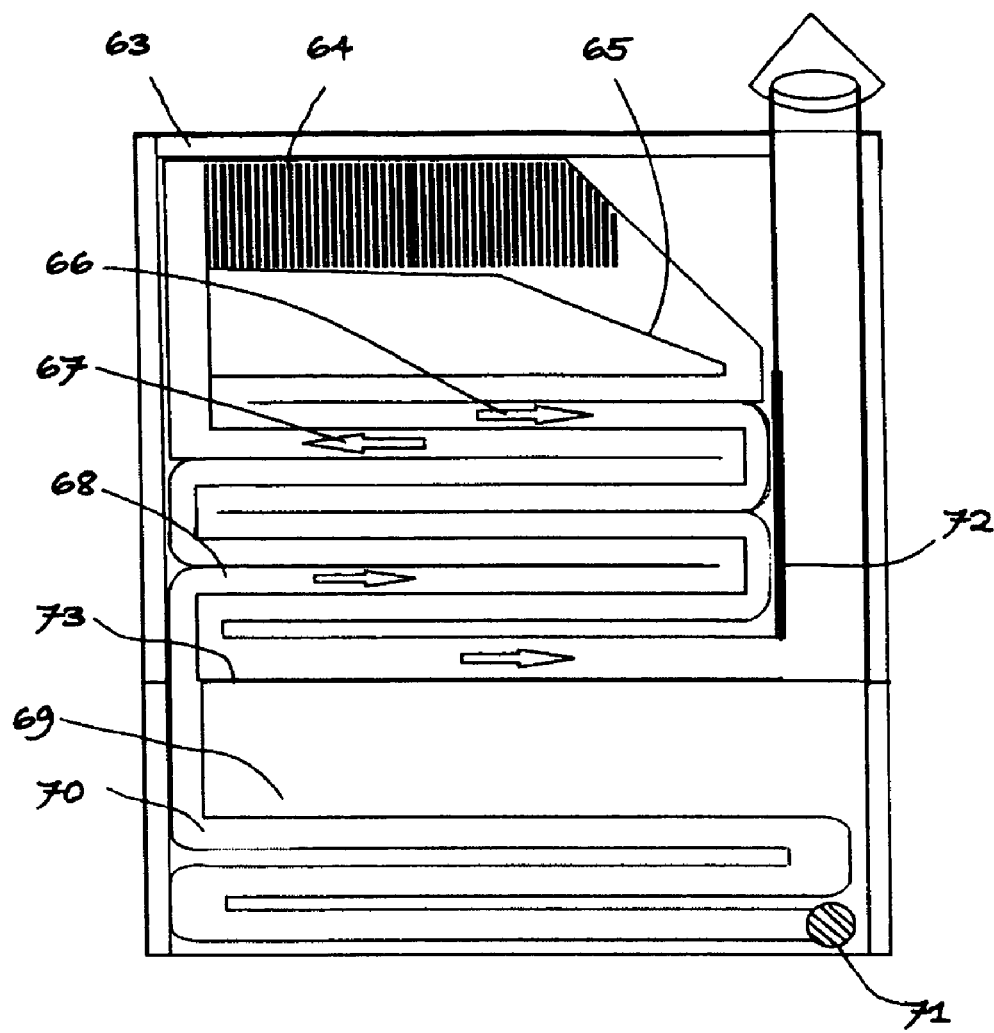
FIG. 11 is an illustration of the air-cooling side of the cooling device in FIG. 3.

FIG. 11 is an illustration of the air-cooling side of the cooling device in FIG. 3. The system creates a cold source as a result of the evaporator 64 of the heat powered cooling system. The system is insulated 63 so as to minimize unwanted heat transfers. With this embodiment, air passes through an air filter 71 and through a coil of tubing 70 that is submersed within the water source created by the system. As this water source is created by the cooling system it will be initially a cool source of water that will pre-cool the air prior to entering main part of the device. Air will then travel up into a counter-flow heat exchanger so as to maximize efficiencies and avoid warming up the evaporator beyond functional limits. As intake air 68 passes in close proximity to exhaust air 66 it will be cooled prior to passing through the evaporator 64. As the water is condensed from the air it will flow down the drip plate 65 and flow through the tubing until it reaches the last pipe before the air exhaust that is fitted with drain holes 73 allowing water to fall into the storage tank 69. Alternately, water may be funnelled out of the tubing system closer to the evaporator and drained directly to the storage tank 69. This design incorporates a power creation device called a thermoelectric module that may be situated between the cooling side and heating side of the system 72.

Figure 12:
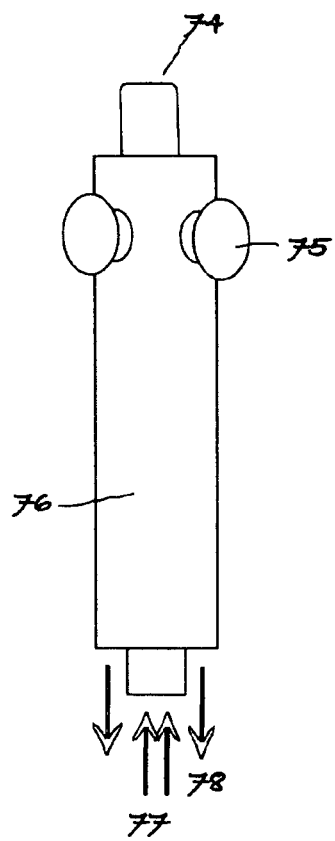
FIG. 12 is an illustration of a counter-flow heat exchange mechanism which will be inserted into the ground and will house the airflow compartments of the device.

FIG. 12 is a illustration of a counter-flow heat exchanger mechanism which will be inserted into the ground and will house the airflow compartments of the device. The smaller center pipe of the counter-flow heat exchanger 74 may as well house a cooling mechanism such as is seen in FIG. 13.

Air enters the device through filters 75 it then travels down in between the two concentric pipes 76 and 74 shown as air-flow 78. The air is then drawn into a storage unit at the bottom of the device before it moves into the center pipe 74 that contains the cooling device of FIG. 13. The air that has been pre-cooled from traveling down into the earth then enters into the center pipe 74 containing the cooling mechanism of FIG. 13 where it will cool air to below its dew point temperature thus drawing the water from this air. This condensed water will then be drawn down by gravity into a storage tank directly beneath this condensing mechanism. The process air will then move upward to the top of the counter-flow exchanger 74 where it will continue to move until it is expelled from the system.

Figure 13:
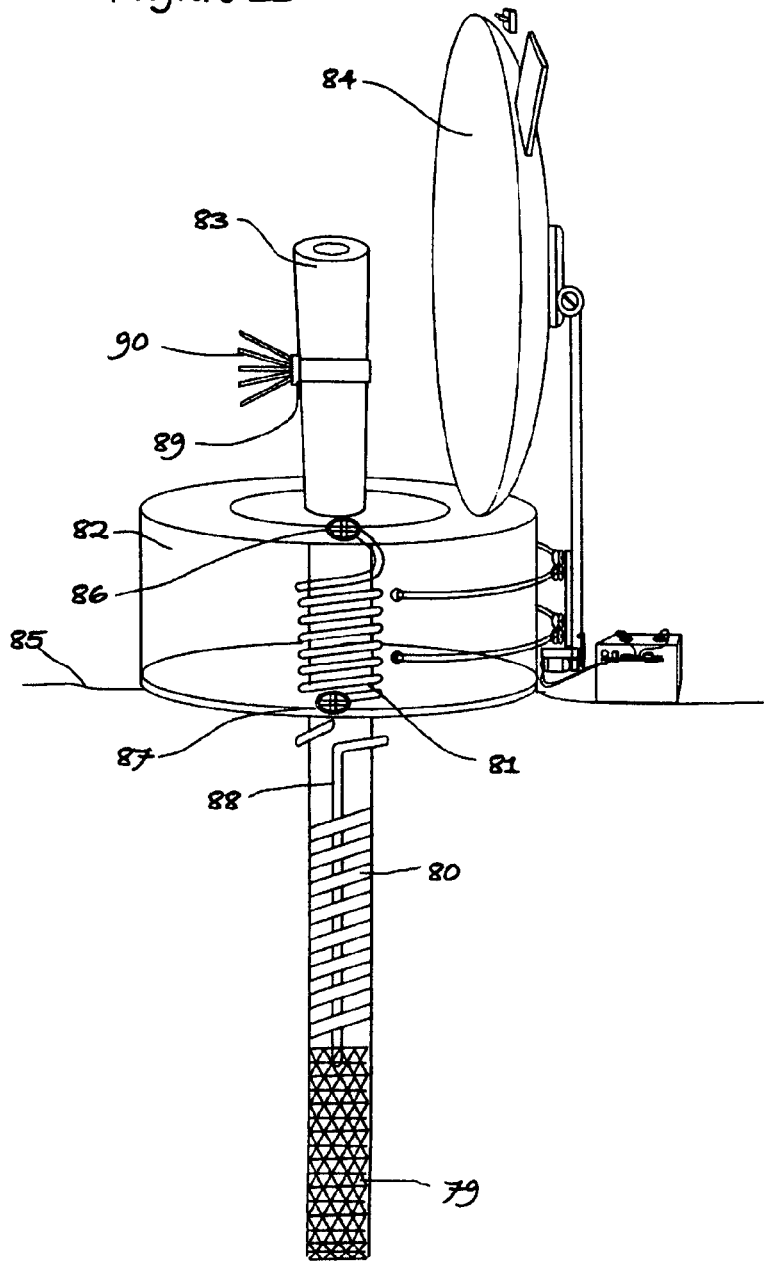
FIG. 13 is a variation of an in ground condensation unit in which the system employs a working fluid such as an ammonia solution inside of a cooling system that converts solar energy into a cold source to facilitate the condensation process.

FIG. 13 is a variation of an in ground condensation unit in which the system employs a working fluid such as an ammonia solution inside of a cooling system that converts solar energy into a cold source to facilitate the condensation process. A solar reflector 84 is used to focus light on the convection tube 83 and/or heat exchanger. The light is converted to heat energy which provides both air flow, through creating temperature gradients in the pipe, and a high temperature heat reservoir for the operation of other devices such as a thermoelectric module(s) to create a power source. The thermoelectric module 89 will be positioned such that the heated side is against the convection column 83 while the cooler side is in contact with a cooling fin device 90 to help lower the temperature on the cooler side of the module. This power source would be used to power the tracking mechanism for the reflector and to power one or more fans to assist in drawing air through the system. The basic function of the airflow system is addressed in Applicant's patent application PCT CA03/00860 and in this document. The convection tube 83 is hollow walled and made of two concentrically situated pipes (such as is seen in 76 and 74 of FIG. 12). In the cavity between the two pipes, which is sealed top and bottom by two plates, there is a working fluid solution such as $CaCl_2$. In the bottom plate there is a threaded hole to which a stainless steel tap may be inserted. Connected to the tap will be a helical condenser coil 81 that is situated inside a cool water bath 82. In an alternate configuration the coil may be exposed and situated beneath the surface of the earth 85 allowing the earth to provide the heat sink required. In FIG. 13 the same pipe used to make the condenser coil 81 is bent in such a way that it is aligned with the symmetrical axis of the coil. The condenser coil pipe is fitted with two taps 86 and 87 just below and above the coil. From the tap below the coil a pipe 88 is used to connect to a reservoir 79 that will serve as the evaporator for the cooling system. This reservoir will be fitted with cooling fins to allow increased surface area for air to come in contact with, thus improving device efficiencies. The air-flow and cooling system will function much like the design seen in FIG. 2 of this application.

Another embodiment may be a construction in which solar energy is used to heat a heat exchanger or solar oven whose purpose is to regenerate multiple canisters containing zeolite. The zeolite process would use a distillation process to separate the water from the zeolite. Multiple canisters could be "charged" simultaneously and the oven could be running constantly throughout the day with oven temperatures set through valves in the piping to the heat exchanger which is heated with solar energy concentrated by a parabolic dish or trough. Zeolite must be regenerated with a proper process, which is easily automated through use of small electronic sensors to control the oven temperatures.

As a means to create a power source within the device the variant temperatures within the device are utilized. It is known that through the application of the "Peltier Effect" a direct electrical current passed through a thermoelectric couple will cause heat to be absorbed at one end of the couple to cause cooling while heat is rejected at the other end of the couple to cause a rise in temperature. In reversing this current flow, the direction of the heat flow will as well be reversed.

Thermoelectric modules are typically constructed of an array of semiconductor couples (P and N Pellets) connected electrically in series and situated parallel between metallic ceramic substrates.

The reverse of the above process is the "Seebeck Effect" where a thermocouple generates an electric current across its terminals if a temperature variance is provided across the module when in an open circuit mode. Therefore, electric power can be calculated as a function of temperature difference between both ends of the module.

The application of this principle is of particular value within this device as both very hot and very cool temperature sources are in close proximity. One or more thermoelectric modules could be placed within the device creating an electrical charge to be used to power fans, drive motors, or charge batteries.

Just a couple of the many strategic locations for placement of these modules would be between the generator and evaporator of the cooling system or surrounding the solar heater 44 of FIG. 3. With the solar heater application a cooling fin mechanism could be applied to the "cooler" side of the module allowing for more efficient function.

The designs illustrated here are only a few of many potential embodiments. Conventional cooling systems could be utilized with fans to circulate the air. A wide variety of materials could be utilized in this process, all serving the same basic function.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An atmospheric water collection device for condensing moisture vapour in atmospheric air into water comprising:
   (a) at least one intake for receiving said atmospheric air;
   (b) means for drawing said atmospheric air through said at least one intake;
   (c) means for cooling and condensing said atmospheric air to water, wherein said atmospheric air is cooled by drawing said atmospheric air underground;
   (d) an area for condensing said atmospheric air into water;
   (e) an exhaust for exhausting said atmospheric air after said atmospheric air has been condensed;
   (f) means for collecting said water; and
   (g) a generator, said generator comprising:
      (i) a housing for storing ammonia;
      (ii) means for supplying calcium chloride to said housing;
      (iii) a condenser coil, located in said area for condensing said atmospheric air; and
      (iv) an evaporator;
   wherein after a solar collector heats said ammonia and said calcium chloride in said housing to produce a refrigerant solution, said refrigerant solution is transmitted to said condenser coil to cool and condense said atmospheric air surrounding said condenser coil to condense said atmospheric air.

2. The atmospheric water collection device of claim 1 wherein said means for drawing said atmospheric air through said at least one intake comprises: a convection column; and a solar collector, attached to said convection column for heating air within said atmospheric water collection device to draw said atmospheric air in through said at least one intake to said convection column.

3. The atmospheric water collection device of claim 2 further comprising: a fan, located on said convection column.

4. The atmospheric water collection device of claim 2 wherein said generator is a heat exchanger.

5. The atmospheric water collection device of claim 4 wherein said heat exchanger comprises: a housing for storing a solution; means for supplying a chemical compound to said housing; a condenser coil, located in said area for condensing said atmospheric air; and an evaporator; wherein after said solar collector heats said solution and said chemical compound in said housing to produce a refrigerant solution, said refrigerant solution is transmitted to said condenser coil to cool and condense said atmospheric air surrounding said condenser coil to condense said atmospheric air.

6. The atmospheric water collection device of claim 4 further comprising: a set of air cooling fins located in said condensing area to assist in condensing said atmospheric air into water.

7. The atmospheric water collection device of claim 4 wherein said solar collector is parabolic.

8. The atmospheric water collection device of claim 7 wherein said generator is located at a focal point of said parabolic solar collector.

9. The atmospheric water collection device of claim 2 further comprising: an adjustment mechanism for controlling movement of said solar collector.

10. The atmospheric water collection device of claim 9 wherein said adjustment mechanism comprises: a sensor mechanism for sensing location of the sun; a motor for providing power to rotate said solar collector towards said location of said sun; and a roller mechanism for controlling movement of said solar collector.

11. The atmospheric water collection device of claim 2 wherein said solar collector comprises: a solar oven; and a reflector apparatus.

12. The atmospheric water collection device of claim 1 wherein said means for collecting said water is a storage tank.

13. The atmospheric water collection device of claim 12 wherein said storage tank comprises a tap spout.

14. The atmospheric water collection device of claim 1 wherein said intake further comprises a filter.

15. The atmospheric water collection device of claim 1 wherein said means for cooling uses Zeolite materials.

16. The atmospheric water collection device of claim 1 further comprising a transfer medium to direct heat.

17. The atmospheric water collection device of claim 1 wherein a vacuum draws said air through said device.

18. The atmospheric water collection device of claim 10, wherein said motor is a Sterling motor.

* * * * *